Sept. 6, 1927. 1,641,601
J. RAIN
OIL CELLAR
Filed May 29, 1926
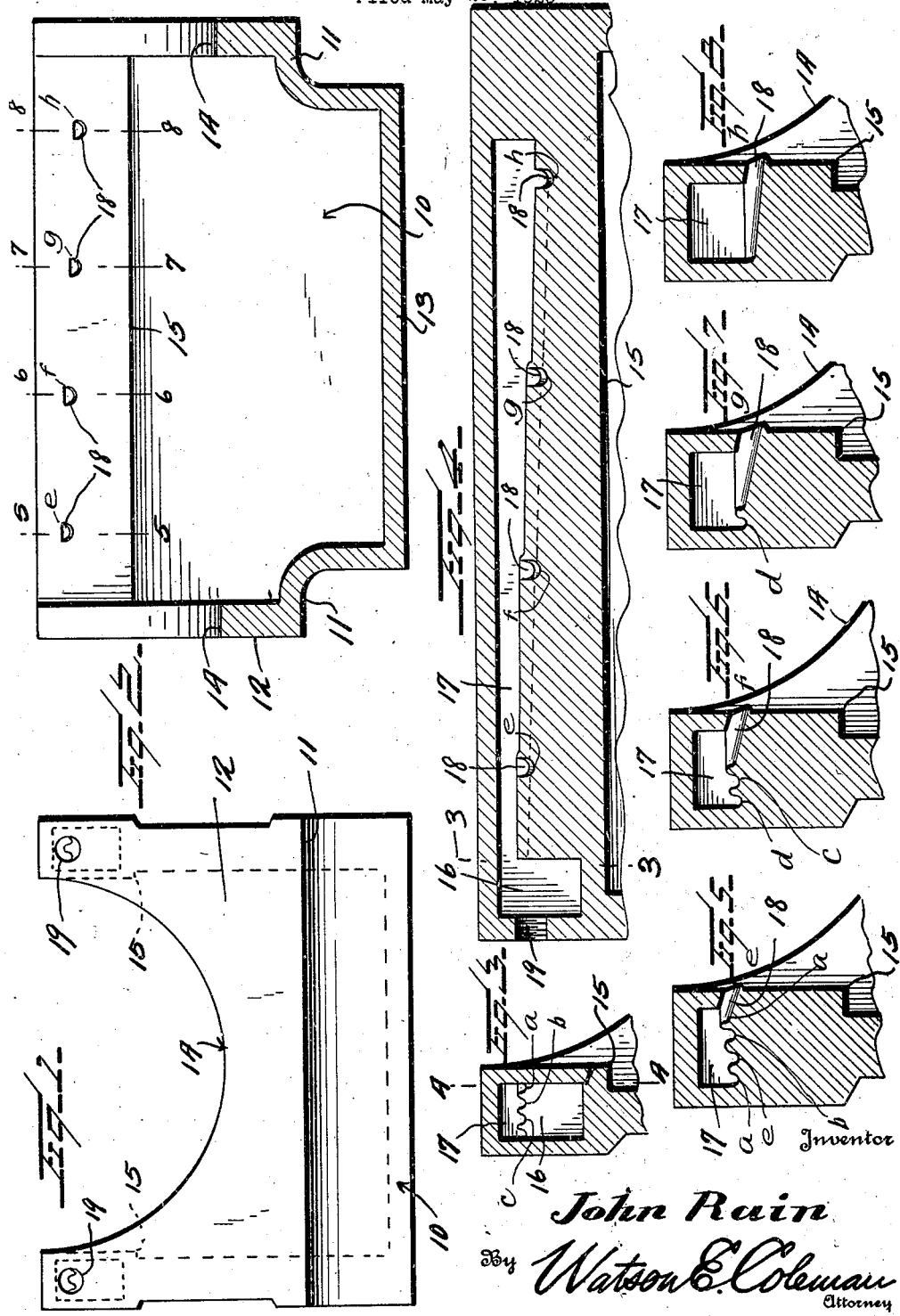

Patented Sept. 6, 1927.

1,641,601

UNITED STATES PATENT OFFICE.

JOHN RAIN, OF SHAWNEE, OKLAHOMA.

OIL CELLAR.

Application filed May 29, 1926. Serial No. 112,615.

This invention relates to the oil cellars used on locomotives, engine trucks, and on trailer journals or on any journal or bearing on the inner side of the wheels where it is not possible to use a one-piece oil box and support for bearing wedge and brass. Journal boxes of this description now in use have a plain cellar under the journal held up to the journal by cellar bolts which extend under the cellar and through the legs of the box and hence the packing in the cellar only gets its oil through a hole in the top of the box and brass. When the packing on top of these boxes gets hard or filled with dirt or the oil hole gets stopped with dirt or Babbitting metal or the packing gets saturated with water, the packing in the cellar gets dry and hard, and thus the bearing runs hot. In many cases the journal cuts and causes expense and delays.

The general object of the present invention is to provide an oil cellar so constructed that the oil will be delivered to the packing in the cellar on each side of the journal, thus insuring perfect lubrication whether or not the packing gets any oil from the top of the drive, engine truck, or trailer boxes.

Another object is to provide means for preventing the packing from rolling up between the bearing or journal and the cellar and another object is to allow a greater amount of packing to be used at this point so as to receive the drip from the oil reservoir of the cellar.

A further object is to provide a construction of this character in which the cellar is formed with a cavity or reservoir on each side wall, this cavity being so formed as to insure a uniform flow of oil and a uniform delivery of oil to the packing at uniformly spaced points.

A still further object is to provide a cellar having oil pockets or reservoirs which will lubricate the packing on both sides of the journal or bearing, thus insuring that the lubricant shall be taken up to the bearing on one side and down into the packing on the opposite side regardless of which way the journal or bearing is turning.

Other objects will appear in the course of the following description.

My invention is illustrated in the accompanying drawings wherein:—

Figure 1 is an end elevation of a cellar constructed in accordance with my invention;

Fig. 2 is a longitudinal sectional view thereof;

Fig. 3 is a section on the line 3—3 of Figure 4;

Fig. 4 is a section on the line 4—4 of Figure 3;

Figures 5, 6, 7, and 8 are sections on lines 5—5, 6—6, 7—7, and 8—8 of Figure 2.

Referring to these drawings 10 designates the cellar generally which is formed with the end walls 11, the side walls 12, and the bottom wall 13. The end walls 11 are, of course, cut away circularly at their ends as at 14, and a shoulder 15 is formed on the inside face of each side wall, this shoulder extending the entire length of the side wall.

Formed in these side walls above the shoulders 15 are the oil pockets 16, these pockets being disposed each at one end of a side wall. Leading from the upper end of each pocket is a longitudinally extending duct 17, the bottom of which duct inclines downward and away from the pocket 16. The bottom of each pocket is formed to provide a plurality of grooves as, for instance, four grooves and formed at intervals along each wall of the cellar are the discharge ducts or feed tips 18. There are as many of these feed tips as there are grooves and these tips are arranged on an inclined plane extending longitudinally of the cellar so that the feed tips are successively lower away from the pocket 16. Thus, the first fed tip intersects the first groove of the series, the second feed tip extends back to the second groove, the third back to the third groove and the fourth feed tip extends back to the outer wall of the duct 17, as illustrated in the sections. Oil drops from the pockets or tips $e$, $f$, $g$ and $h$ onto the packing which is held by the cellar under the journal or bearing. Thus, oil is applied directly onto the packing at all times, insuring perfect lubrication. The oil pocket 16 insures a uniform flow of oil into each groove $a$, $b$, $c$ or $d$ when the oil reaches a level in the pocket which will cause an overflow into these grooves. The grooves $a$, $b$, $c$, and $d$ run downward at an inclination from the outside to the inside end of the cellar so that gravity will insure the oil running in a uniform quantity from the oil pocket 16 to the ports or tips $e$, $f$, $g$ and $h$ feeding, therefore, uniformly into the packing in the cellar.

The shoulder 15 on each side wall of the cellar acts to prevent the packing from being rolled up between the journal or bearing and the cellar and also allows a greater amount of packing at this point for the oil from the ports to drop onto. The packing may be wool waste or cotton waste, straight wool, sponge or any other fibrous material. Oil is discharged into the pocket 16 by means of an oil pipe or oil cup that screws into the cellar at 19. It will be seen that this construction not only secure the advantages which have been referred to heretofore but that as all journals throw off more or less heat caused by friction, the journal will communicate the heat to the packing which in turn communicates it to the cellar for the full length of the oil cavity or duct, thus insuring a free feed of oil in cold weather.

The object of the grooves formed in the floor or bottom of the duct 17 is to secure a uniform amount of oil for each of the tips when the pocket is filled to overflowing as otherwise if the floor of the duct had no grooves, the lowest port or tip would get the greatest amount of oil and the port 18 in the highest position would cease to get oil when the level of the oil is below it. The ports 18 are formed each with an overhanging lip which is disposed at an angle and projects slightly from the wall of the cellar next to the journal. This is so that the oil may drop immediately off the overhanging tip or lip onto the packing instead of running back under the lip which would be the case if these lips were horizontal instead of downwardly and laterally inclined.

One of the important advantages of my invention is that the oil is furnished to the packing continuously and thus the packing is saturated at all times with oil. Thus, when properly packed the cellar and packing should function indefinitely without it being necessary to repack. With the old style cellar now in use it is necessary to repack the cellar each trip and sometimes between terminals.

I claim:—

1. An oil cellar for journal boxes having side walls, each side wall being formed with an oil pocket at its forward end and a duct extending rearward from the oil pocket and having its bottom sloping rearwardly and downwardly, each side wall of the cellar being formed with ports communicating with the interior of the duct adjacent its bottom, and the ports being disposed at spaced intervals.

2. An oil cellar for journal boxes having side walls, each side wall being formed at its forward end with an oil pocket and with a longitudinally extending duct extending from the top of the oil pocket, the bottom of each oil duct having a downward inclination toward the rear of the pocket and the bottom of each oil duct being formed to provide a plurality of channels, each side wall having downwardly and laterally extending ports communicating with said grooves.

3. An oil cellar for journal boxes having side walls, each side wall having at its forward end an oil pocket and having a longitudinally extending duct extending from the top of the oil pocket, each duct at its bottom being inclined downward and rearward and formed with a plurality of grooves, and each side wall having ports extending upward and laterally and communicating with the duct, the longitudinal grooves successively terminating at successive ports.

4. An oil cellar for journal boxes having side walls, each side wall being formed with a longitudinally extending shoulder and each side wall above said shoulder and at the forward end of the side wall being provided with an oil pocket and a duct extending from the top of the oil pocket and having ports opening upon the inner face of the side wall above the shoulder.

5. An oil cellar for journal boxes having side walls, each side wall being formed with a longitudinally extending shoulder and each side wall above said shoulder and at the forward end of the side wall being provided with an oil pocket and a duct extending from the top of the oil pocket and having ports opening upon the inner face of the side wall above the shoulder, the bottom of said duct being inclined downward and rearward and the ports being successively lower in elevation as they near the rear end of the wall.

6. An oil cellar for journal boxes having side walls, each side wall being formed with a longitudinally extending shoulder and each side wall above said shoulder and at the forward end of the side wall being provided with an oil pocket, and a duct extending from the top of the oil pocket and having ports opening upon the inner face of the side wall above the shoulder, the bottom of the duct being inclined downward and rearward and formed with a plurality of channels each terminating at one of the ports, the ports extending downwardly and laterally and having lips at their extremities projecting beyond the inside face of the wall.

In testimony whereof I hereunto affix my signature.

JOHN RAIN.